US009275295B1

United States Patent
Kejriwal et al.

(10) Patent No.: US 9,275,295 B1
(45) Date of Patent: Mar. 1, 2016

(54) NOISE ESTIMATION BASED ON A CHARACTERISTIC OF DIGITAL VIDEO

(75) Inventors: Ashish Kejriwal, West Bengal (IN); Byas Muni, Jharkhand (IN); Sujith Srinivasan, Karnataka (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 1145 days.

(21) Appl. No.: 13/035,322

(22) Filed: Feb. 25, 2011

Related U.S. Application Data

(60) Provisional application No. 61/368,488, filed on Jul. 28, 2010.

(51) Int. Cl.
  *H04N 5/14* (2006.01)
  *G06K 9/40* (2006.01)
  *H04N 5/21* (2006.01)

(52) U.S. Cl.
  CPC ... *G06K 9/40* (2013.01); *H04N 5/21* (2013.01)

(58) Field of Classification Search
  CPC .................................. G06K 9/40; H04N 5/21
  USPC ......................................................... 348/701
  See application file for complete search history.

(56) References Cited

U.S. PATENT DOCUMENTS

| | | | |
|---|---|---|---|
| 2004/0095511 A1* | 5/2004 | Amara et al. | 348/620 |
| 2008/0175512 A1* | 7/2008 | Ohira | 382/263 |
| 2011/0019094 A1* | 1/2011 | Rossignol et al. | 348/607 |

\* cited by examiner

*Primary Examiner* — Richard Torrente

(57) ABSTRACT

Systems and methods are provided for determining a characteristic of video data. A set of N frames of the video data is obtained and filtered using at least one filter to produce a set of N×T blocks of filtered video data, where T is a partition size associated with the at least one filter. Each block in the set of N×T blocks is classified as either a first type block or a second type block. A subset of blocks in the set of N×T blocks is associated with a corresponding frame from the set of N frames. The characteristic of video data is determined based, at least in part, on the subset of blocks in the set of N×T blocks that are associated with the frame.

18 Claims, 6 Drawing Sheets

$$\begin{bmatrix} 1 & -1 \\ -1 & 1 \end{bmatrix}\Big\} 425 \qquad \begin{bmatrix} 1 & 1 \\ -1 & -1 \end{bmatrix}\Big\} 430 \qquad \begin{bmatrix} 1 & 1 \\ -1 & -1 \end{bmatrix}\Big\} 440$$

FIG. 4 ion No. 61/368,488, filed Jul. 28, 2010, which is hereby incorporated by reference herein in its entirety.

NOISE ESTIMATION BASED ON A CHARACTERISTIC OF DIGITAL VIDEO

CROSS REFERENCE TO RELATED APPLICATION

This application claims the benefit under 35 U.S.C. §119 (e) of U.S. Provisional Application No. 61/368,488, filed Jul. 28, 2010, which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Digital video is generated by many sources, including digital camcorders, digital cameras, and monitoring devices. Noise, which is typically present digital video, corrupts and distracts from the visual display of the video. Noise may be introduced during many phases in the generation of digital video, including during a video capture, during a conversion of light to pixel values using a Charge-Coupled Device (CCD) sensor, during a transmission of digital video from a source to a destination (e.g., due to corruptive effects of a transmission medium), and/or during a conversion of an analog video source into a digital format (e.g., due to quantization effects and other imperfections in the conversion process). The presence of noise in digital video is particularly pronounced on modern displays, which are often large and display high resolution content.

Knowledge of noise characteristics of a digital video enables noise reduction and/or removal techniques that are tailored to the particular video, and this may increase the effectiveness of the noise reduction and/or removal. For example, de-interlacing, motion estimation, edge enhancement, and other adaptive and non-adaptive video post processing techniques may use determined noise characteristics to process and enhance a digital video that contains noise.

SUMMARY

In accordance with an embodiment of the invention, a technique is provided for determining a characteristic of video data. A set of N frames of the video data is obtained and filtered using at least one filter to produce a set of N×T blocks of filtered video data, where T is a partition size associated with the at least one filter. Each block in the set of N×T blocks is classified as either a first type block or a second type block. A subset of blocks in the set of N×T blocks is associated with a corresponding frame from the set of N frames. The characteristic of video data is determined based, at least in part, on the subset of blocks in the set of N×T blocks that are associated with the frame.

In accordance with another embodiment of the invention, a video processing system is provided for determining a characteristic of video data. Acquisition circuitry obtains a set of N frames of the video data. Filtering circuitry applies at least one filter to the set of N frames to produce a set of N×T blocks of filtered video data, where T is a partition size associated with the at least one filter. Estimation circuitry classifies each block in the set of N×T blocks as either a first type block or a second type block, associates a subset of blocks in the set of N×T blocks with a corresponding frame from the set of N frames, and determines the characteristic of video data based, at least in part, on the subset of blocks in the set of N×T blocks that correspond to the frame.

In an arrangement, m estimates of the characteristic of video data are determined based on pixel values of blocks in the set of N×T blocks that have been classified as a flat type, and one of the m estimates is selected as the characteristic of video data based, at least in part, on pixel values of the subset of blocks in the set of N×T blocks that correspond to the frame. In an arrangement, the at least one filter includes a diagonally oriented high-pass filter and/or a horizontally oriented high-pass filter. In an arrangement, the characteristic of video data is a standard deviation value associated with noise present in the set of N frames. In an arrangement, the characteristic of video data is a median absolute deviation value associated with noise present in the set of N frames. In an arrangement, a new set of N frames of the video data is obtained, and a noise reduction technique is applied to the new set of N frames, where a parameter of the noise reduction technique depends on the determined characteristic of video data.

In an arrangement, determining a video characteristic includes inputting a set of T blocks of filtered video data to a maximum module to produce a first output, inputting the set of T blocks of filtered video data to a minimum module to produce a second output, and determining at least one variance measure of a video frame based on the first output and second output. In another arrangement, determining a video characteristic includes inputting a set of T blocks of filtered video data to a maximum module to produce a first output, inputting the set of T blocks of filtered video data to a minimum module to produce a second output, and determining at least one activity value associated with a video frame based on the first output and second output.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 4 shows illustrative examples of high-pass directional filters in accordance with an arrangement;

DETAILED DESCRIPTION

Traditional video processing techniques perform noise reduction and/or removal from video without adequately determining characteristics of noise present in the video. These techniques are likely to either over-soften video data by removing image details (i.e., when an excessively high-level of noise reduction is applied to the video) or remove insufficient image noise (i.e., when an inadequate amount of noise reduction is applied to the video). Thus, estimating an amount of noise present in video makes noise reduction and other video processing more effective. Some methods for noise estimation exploit temporal correlation, but are computationally burdensome as a result (e.g., requiring frame storage and processing). Traditional techniques for noise reduction and/or removal perform poorly and/or require excessive computational resources for these and other reasons.

Figure 1:
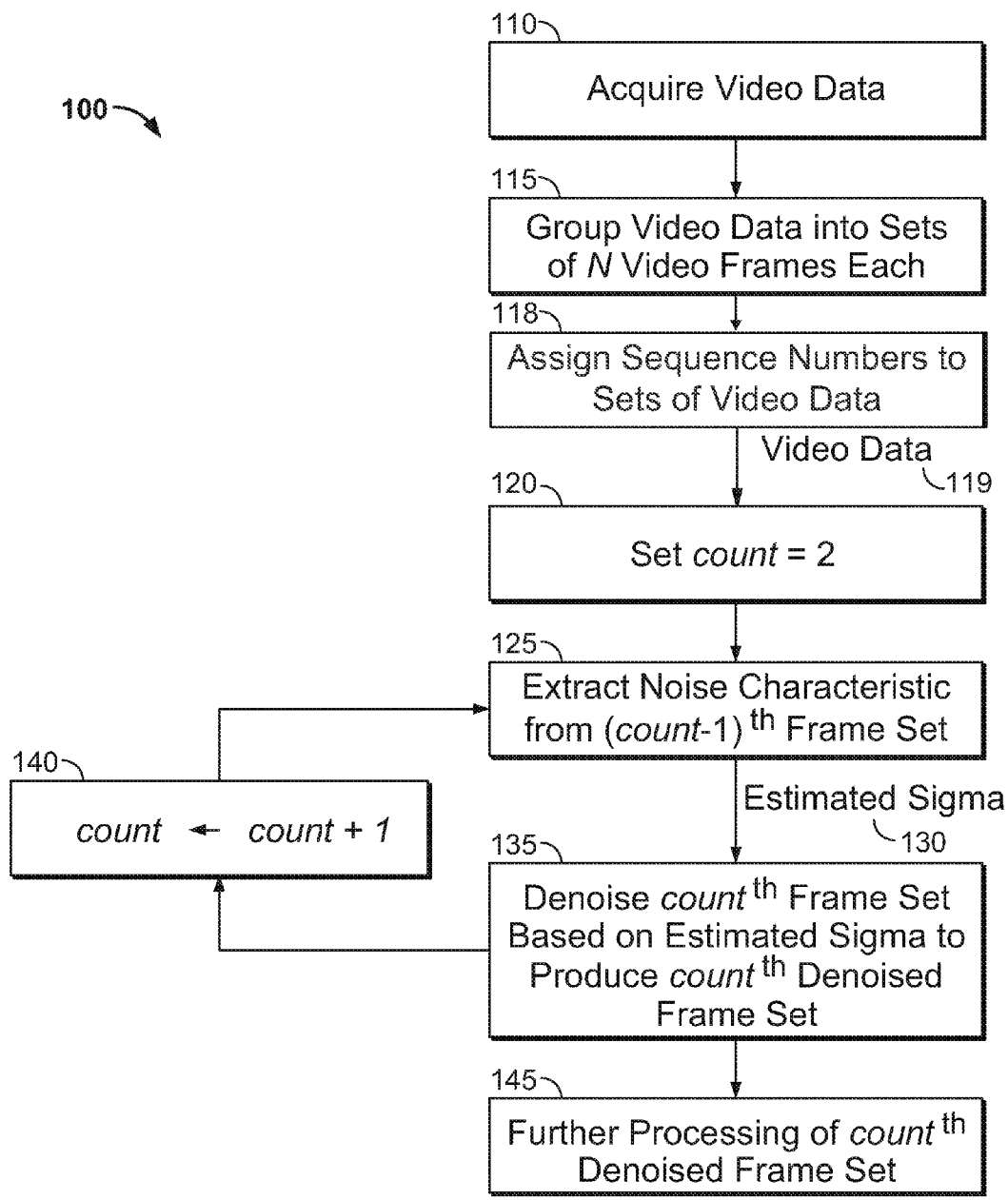
FIG. 1 shows an illustrative process that may be used by a video processing system to identify noise characteristics present in frames of video data in accordance with an arrangement.

FIG. 1 shows an illustrative process that may be used by a video processing system to identify noise characteristics present in frames of video data in accordance with an arrangement. Process 100 analyzes a set of N frames of video data to determine a noise characteristic associated with the N video frames. Subsequently, a next set of N video frames is analyzed and an updated value of the noise characteristic is determined. In this manner, process 100 determines a noise characteristic corresponding to a current set of N video frames, and updates the value of the determined noise characteristic based on a next set of N video frames.

At 110, process 100 acquires video data. The video data may correspond to a video stream, and is portioned or otherwise segmented into a series of video frames. The video frames may correspond to, for example, a high-definition video, and there may be 24 or 25 video frames per second of video data. At 115, process 100 groups the frames of video data acquired at 110 into sets of N video frames each, where each set of N frames is referred to as a frame set.

At 118, process 100 assigns sequence numbers to some or all of the frame sets determined at 115. In particular, all or some of the frame sets determined at 115 are assigned sequence numbers, starting with the number 1. In an advantageous arrangement, video frames are assigned sequence numbers in the same order that they are received and grouped into frame sets at 110, so that the first frame set is assigned sequence number 1, the second frame set group at 115 is assigned sequence number 2, and so on. It will be assumed that video frames are grouped in the order that they were received for clarity of presentation. The output of 118 is referred to as video data 119.

It should be understood based on the disclosure and teachings provided herein that sequence numbers may be assigned to frame set in any suitable order. For example, an irregular assigned of sequence numbers to frame sets may be implemented based on, e.g., the amount of storage available during implementation of process 100. Further, it should be understood based on the disclosure and teachings provided herein that the N video frames allocated to a given frame set may be determined based on image characteristics, expected temporal characteristics of the video data, and/or by any other suitable measure.

At 120, process 100 sets a counter, referred to as count, to a value 2. At 125, process 100 extracts a noise characteristic corresponding to the (count-1)$^{th}$ frame set (i.e., the frame set having a sequence number of count-1) based on an analysis of the individual video frames of the (count-1)$^{th}$ frame set. The extracted noise characteristic is referred to as estimated sigma 130. At 135, process 100 uses estimated sigma 130 to remove noise from the count$^{th}$ frame set. That is, the extracted noise characteristic determined in the (count-1)$^{th}$ frame set used to denoise the count$^{th}$ frame set. For example, if N=64, then estimated sigma 130 may be determined based on the first 64 video frames obtained at 110, and estimated sigma 130 would then be used to denoise the next set of 64 video frames, i.e., video frames 65 through 127, that were acquired at 110. It should be understood based on the teachings of the present disclosure that, in an alternate arrangement, process 100 may extract a noise characteristic corresponding to a frame set having a sequence number other than a sequence number (count-1). For example, process 100 may extract a noise characteristic corresponding to any previous frame set (i.e., having a sequence number less than (count-1)) at 125.

Using the extracted noise characteristic determined in a given frame set to denoise the next frame set works well because noise characteristics typically do not change significantly between consecutive video frame sets. Further, in an arrangement, the value of N is chosen sufficiently small to ensure that noise characteristics do not change significantly between consecutive frame sets.

Process 100 may use any suitable technique to perform denoising at 135. Further, process 100 may use adaptive techniques to perform denoising at 135. At 145, the denoised count$^{th}$ frame set is further processed. The further processing may include removing residual noise or other artifacts, such as compression artifacts, from the denoised count$^{th}$ frame set. For example, denoised count$^{th}$ frame set may be stored in a mass storage device, transmitted via a wireless link, and/or displayed to a user on a high-definition television set or a computer monitor at 145. The further processing may also use an estimated noise characteristic extracted at 125. For example, a level of edge enhancement can be decreased for video frames that are estimated to have high noise signature to avoid reintroducing suppressed noise at 135.

At 140, the value of the counter count is incremented by 1 and process 100 returns to 125 to extract a noise characteristic associated with a frame set having a sequence number equal to the value of count assigned at 140. Thus, in the described manner, process 100 determines a noise characteristic corresponding to a current set of N video frames, and updates the value of the determined noise characteristic based on a next set of N video frames.

Figure 2:
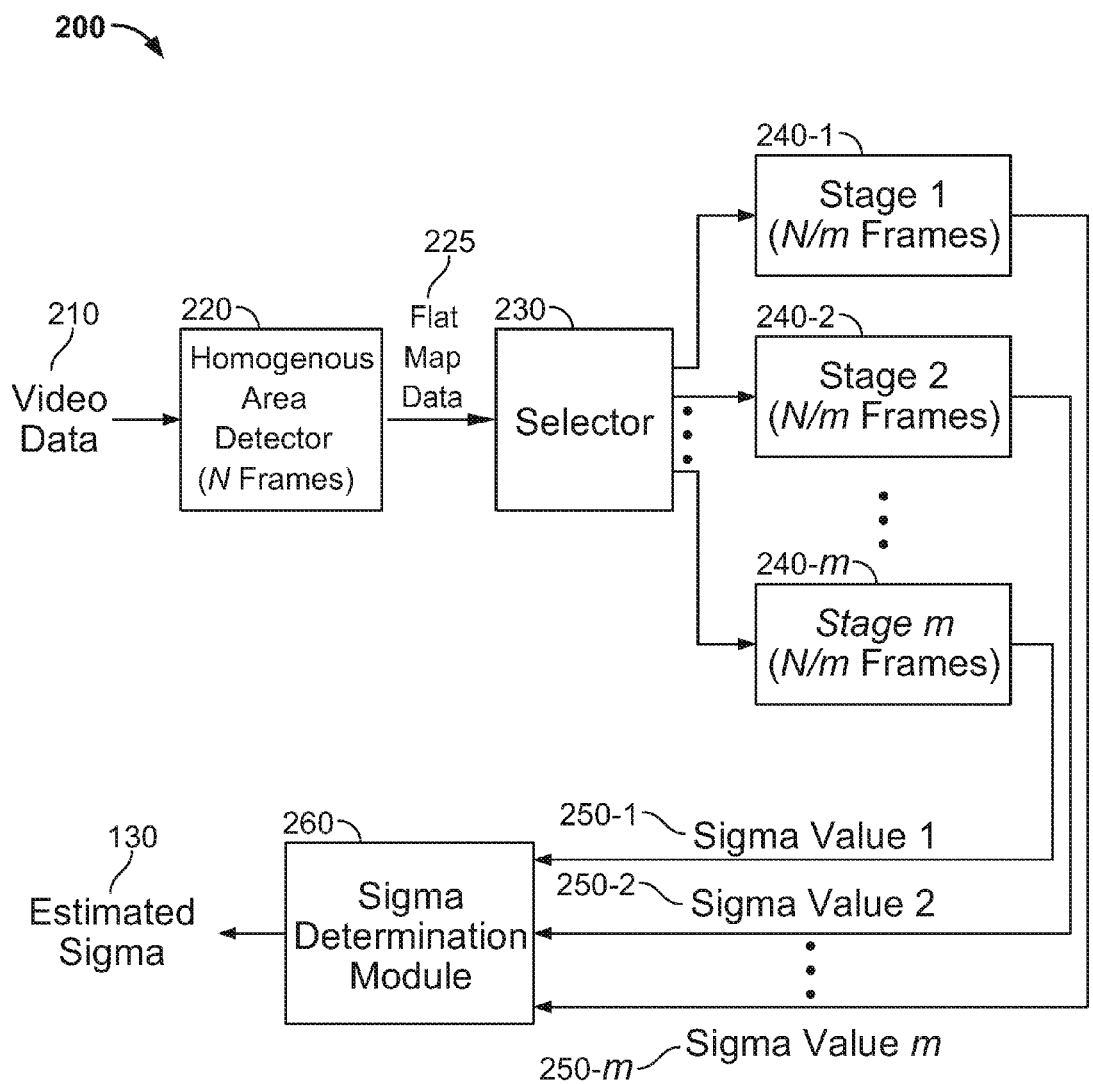
FIG. 2 shows an illustrative portion of a video processing system that is used to estimate a noise characteristic from frames of video data in accordance with an arrangement.

FIG. 2 shows an illustrative portion of a video processing system that is used to estimate a noise characteristic from frames of video data in accordance with an arrangement. Video processing system 200 may be used by process 100 (FIG. 1) at 125 (FIG. 1) to extract a noise characteristic from a suitable frame set. In particular, video data 119 and estimated sigma 130 depicted in FIG. 3 correspond to video data 119 and estimated sigma 130, respectively, depicted in FIG. 1.

Video data 119 is obtained from a suitable video source. For example, video data 119 may be derived from a traditional analog or digital television signal, video recording signal, Internet transmission, or a permanent or portable digital storage device signal. Video data 119 is logically and/or physically segmented into frames of video data, where each frame corresponds to a single still image of video from video data. In an arrangement, video data 119 corresponds to data acquired at 110 (FIG. 1).

In an arrangement, each frame of video data 119 represents an image from a high-definition television broadcast. For example, each frame may represent a total of 1280×720 or 1920×1080 pixels of data. Video data is assumed in the disclosure herein to represent luminance values. However, it should be understood based on the disclosure and teachings provided herein that the techniques described herein are readily applicable to case where video data 119 corresponds to chrominance data, or a combination of luminance data and chrominance data.

Video data 119 is input to homogenous area detector 220. Homogenous area detector 220 obtains a frame set of video data 119 (i.e., N video frames from video data 119) and classifies each pixel of each of the N frames as either flat (denoted by an output bit value '0') or detailed (denoted by an output bit value '1'). Thus, if each frame of video data 119 is of P×Q pixels, then homogenous area detector 220 obtains a total of N×P×Q pixels of video data 119 as input, and outputs a corresponding N×P×Q pixels, where each output pixel denotes either a flat pixel or a detailed pixel. The output of homogenous area detector 220 will be referred to as flat map data 225.

Selector 230 receives N frames of output from homogenous area detector 220, and allocates each of the N frames to one of m stages, where N and m are chosen so that the ratio N/m is an even integer. For example, in an arrangement N=64. In this case, m may be chosen to have the value 4. Selector 230 would allocate each of the N frames output by homogenous area detector 220 to one of m=4 stages, and thus, each stage would receive N/m=16 frames. In an advantageous arrangement, video frames are allocated consecutively to each given stage. For example, if N=64 and m=4, the stage 1 would receive frames 1-16, stage 2 would receive frames 17-32, stage 3 would receive frames 33-48, and stage 4 would receive frames 49-64. In the subsequent disclosure, it will be assumed that video frames are allocated consecutively to each given stage for clarity of presentation. However, it should be understood based on the teachings of the present disclosure that video frames may be allocated in a non-consecutive order to the stages depicted in FIG. 2 and/or that an unequal number of frames may be allocated among the stages depicted in FIG. 2.

The m stages of video processing system 200, i.e., stage 240-1 through stage 240-m, are depicted in FIG. 2. Each of stages 240-1 through 240-m receives a total of N/m×P×Q pixels from selector 230, and processes the pixels that correspond flat regions of video data 119 (i.e., those pixels associated with a bit value '0') using a corresponding estimator to obtain an estimate of a noise characteristic of the current frame set of video data 220. In particular, stage 240-k produces an estimate sigma value k 250-k, for each value of k between 1 and m, as depicted in FIG. 2.

It will be assumed for clarity in the subsequent disclosure that each of stages 240-1 through 240-m determines an estimate of a standard deviation of a Gaussian representation of noise. In particular, it will be assumed that stage 240-k, for k between 1 and m, determines an estimate based on the N/m video frames allocated to it by selector 230. In an arrangement, each of stage 240-1 through stage 240-m uses an estimation technique that depends on the number of the stage. For example, each stage may use an estimator with stage dependent thresholds and/or parameter settings. In an arrangement, thresholds of process 200 (which will be further described in the subsequent disclosure), including th_pix, th_var, and th_map, and th_flat_1 through th_flat_m are assigned to progressively larger values, so that each of stage 1 240-1 through stage m 240-m classifies progressively more pixels as flat pixels.

It should be understood based on the teachings of the present disclosure that some or all of the estimators employed at stages 240-1 through 240-m may determine a different noise characteristic (i.e., other than an estimate of a standard deviation of a Gaussian) and that some or all of the estimators employed at stages 240-1 through 240-m may use the same (or similar) estimation technique. The estimates produced by stages 240-1 through 240-m are referred to as sigma value 1 250-1 through sigma value m 250-m, respectively.

Figure 6:
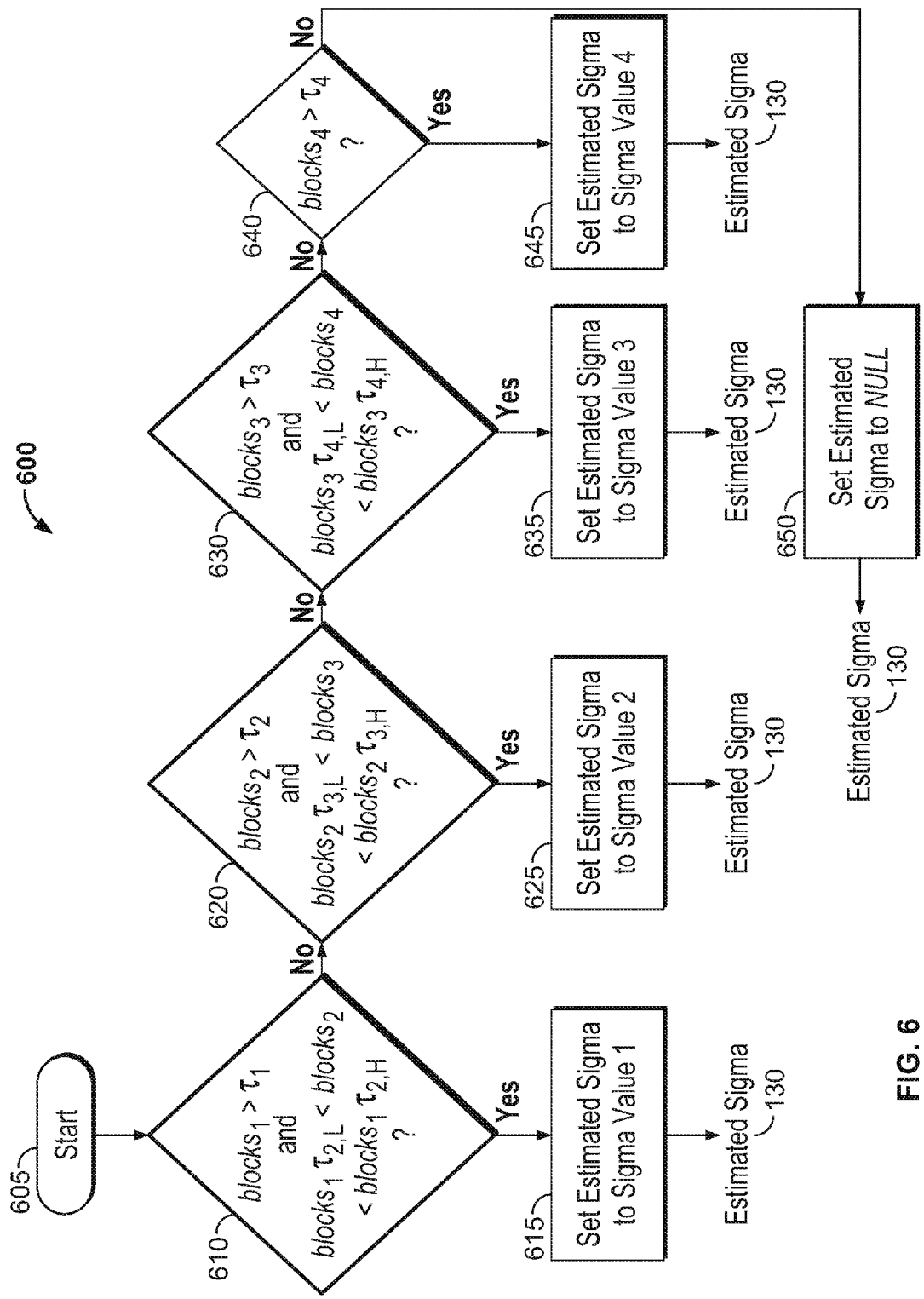
FIG. 6 shows illustrative example of an estimation process that is used to select a noise characteristic from a set of candidate noise characteristics in accordance with an arrangement.

Video processing system 200 provides the estimates, sigma value 1 250-1 through sigma value m 250-m, to sigma determination module 260. Sigma determination module 260 determines an overall value of the estimated noise characteristic, referred to as estimated sigma 130 (FIGS. 1, 2, and 6), based on sigma value 1 250-1 through sigma value m 250-m. In an arrangement, sigma determination module 260 may assign one of sigma value 1 250-1 through sigma value m 250-m as estimated sigma 130 (FIGS. 1, 2, and 6). In another arrangement, sigma determination module 260 may linearly weigh or otherwise combine some or all of sigma value 1 250-1 through sigma value m 250-m to produce estimated sigma 130 (FIGS. 1, 2, and 6).

Figure 3:
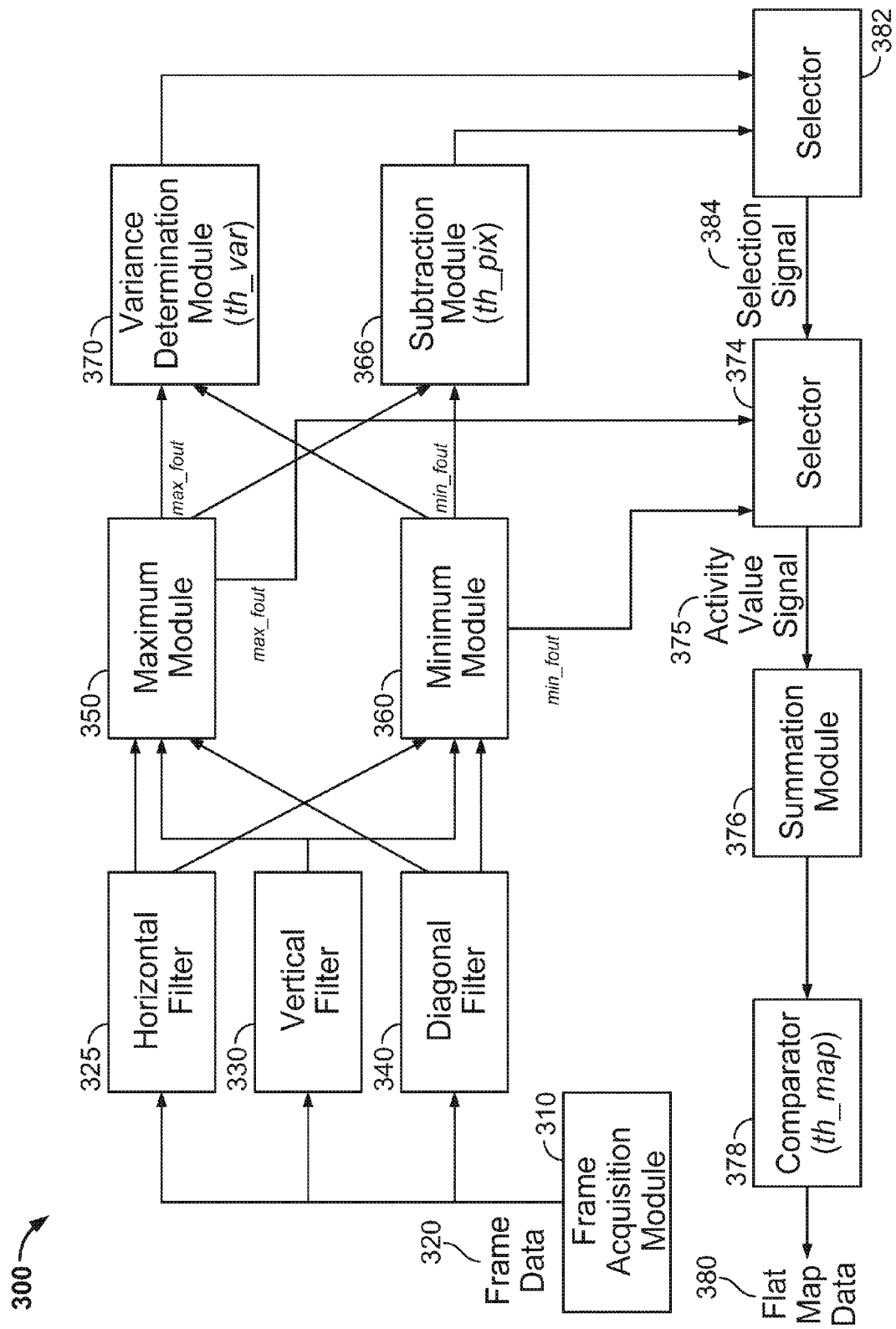
FIG. 3 shows an illustrative portion of a video processing system that is used classify each pixel of a frame of video data as either flat or detailed in accordance with an arrangement.

FIG. 3 shows an illustrative portion of a video processing system that is used classify each pixel of a frame of video data as either flat (denoted by an output bit value '0') or detailed (denoted by an output bit value '1') in accordance with an arrangement. In an arrangement, detector 300 is implemented by video processing system 200 (FIG. 2) in homogenous area detector 220 (FIG. 2). In this arrangement, the operation of detector 300 is performed consecutively N times, i.e., once for each frame in a frame set of video data acquired by homogenous area detector 220 (FIG. 2).

Detector 300 acquires a frame of video data of P×Q pixels, i.e., frame data 320, using frame acquisition module 310. For example, frame acquisition module 310 may provide one frame from among the N frames of a frame set as frame data 320. In an arrangement, frame data 320 corresponds to video data 119 (FIGS. 1 and 2). As depicted in FIG. 3, detector 300 filters frame data 320 using three filters configured in parallel. Each of these filters is a high-pass directional filter with filter coefficients selected to produce output that discriminates between noise characteristics and natural image details in frame data 320. For clarity of presentation, it will be assumed in the disclosure herein that detector 300 filters frame data 320 using horizontal filter 325, vertical filter 330, and diagonal filter 340, as shown in FIG. 3. However, it should be understood based on the disclosure and teachings provided herein that detector 300 may, in other arrangements, employ more or fewer filters than depicted in FIG. 3. Further, it should be understood based on the disclosure and teachings provided herein that some or all of the filters depicted in FIG. 3 may be replaced with other suitable filters without departing from the spirit and scope of the present disclosure. The output of each of horizontal filter 325, vertical filter 330, and diagonal filter 340 is a respective P×Q matrix of filtered pixel values.

The P×Q matrix of outputs from each of horizontal filter 325, vertical filter 330, and diagonal filter 340 is input to each of maximum module 350 and minimum module 360, as depicted in FIG. 3. Maximum module 350 produces a P×Q matrix output, referred to as max_fout, that is determined by taking the element-wise maximum value from among the outputs of horizontal filter 325, vertical filter 330, and diagonal filter 340. Similarly, minimum module 360 produces a P×Q matrix output, referred to as min_fout, that is determined by taking the element-wise minimum value from among the outputs of horizontal filter 325, vertical filter 330, and diagonal filter 340.

Large, directional image features typically produce a large output in response to at most two of horizontal filter 325, vertical filter 330, and diagonal filter 340. Therefore, if the quantity (max_fout-min_fout) is small, this indicates that a corresponding pixel or pixels of frame data 320 represent homogenous image details. Thus, subtraction module 366 determines the value (max_fout-min_fout) and produces a corresponding P×Q matrix output. Subtraction module 366 then compares each of the P×Q matrix output values to a threshold th_pix, and produces a corresponding binary valued P×Q output. In particular, subtraction module 366 outputs the value '1' if a given element of the quantity (max_fout−min_fout) is larger than th_pix, and the value '0' otherwise.

If the quantity (max_fout−min_fout) exhibits relatively constant values over a localized neighborhood, it is likely that a corresponding localized neighborhood of frame data 320 includes homogenous image details. Thus, variance determination module 370 computes the variance of (max_fout−min_fout) over a 3×3 pixel area. Variance determination module 370 then compares each of the P×Q output values to a threshold th_var, and produces a corresponding binary valued P×Q matrix output. In particular, variance determination module 370 outputs the value '1' if the variance of (max_fout−min_fout) over the 3×3 neighborhood is larger than th_var, and outputs the value '0' otherwise. It should be understood based on the teachings of the present disclosure that a pixel area of a size other than 3×3 can be used by variance determination module 370 in computation of a variance. For example, rectangular or irregular pixel patterns of any suitable size may be used.

The outputs of variance determination module 370 and subtraction module 366 are compared by selector 382, which outputs P×Q matrix referred to as selection signal 384. In particular, selector 382 sets a given element of selection signal 384 to a '1' value if the corresponding outputs of variance determination module 370 and subtraction module 366 are each '1' valued, and selector 382 sets the given element to a '0' value otherwise. That is, an element of selection signal 384 is assigned a '1' value only if a corresponding pixel of frame data 320 has been identified as corresponding to a homogenous pixel based on both a variance test (implemented by variance determination module 370) and a subtraction test (implemented by subtraction module 366), as described above. In an arrangement, selector 382 is implemented by at least one AND gate, or other logic equivalent to at least one AND gate.

Selector 374 determines an activity value corresponding to each of the P×Q pixels of frame data 320. In particular, selector 374 obtains the value of min_fout and max_fout corresponding to a given pixel of frame data 320. Selector 374 then assigns an activity value of max_fout to the pixel if corresponding outputs of variance determination module 370 and subtraction module 366 are each '1' valued (i.e., if a corresponding element of selection signal 384 is '1' valued), and selector 374 assigns an activity value of min_fout otherwise (i.e., if the corresponding element of selection signal 384 is '0' valued). This process is repeated, or carried out in parallel, for each of the P×Q elements of frame data 320. In an arrangement, selector 374 may be implemented using at least one multiplexer.

For each element of activity value signal 375, summation module 376 computes the summation of elements of activity value signal 375 over a 2×5 neighborhood, and comparator 378 then compares this value to the threshold th_map. If the summation exceeds th_map, a corresponding pixel of frame data 320 is classified as a pixel from a detailed image area, and if the summation is less than or equal to the value th_map, the corresponding pixel of frame data 320 is classified as a pixel from a flat image area. This process is repeated for every element of activity value signal value 375. Comparator 378 outputs P×Q matrix flat map data 225, which contains a classification of each pixel of frame data 320 as either a "flat" pixel or a "detailed" pixel. It should be understood based on the teachings of the present disclosure that summation module 376 may use a neighborhood size other 2×5 pixels to calculate a summation. For example, rectangular or irregular pixel patterns of any suitable size may be used.

FIG. 4 shows illustrative examples of high-pass directional filters in accordance with an arrangement. The high-pass direction filters are illustrative of filters that may be implemented by detector 300 at some or all of horizontal filter 325 (FIG. 3), vertical filter 330 (FIG. 3), and diagonal filter 340 (FIG. 3). In particular, filter 425 depicts an illustrative example of horizontal filter 325 (FIG. 3), filter 430 depicts an illustrative example of vertical filter 330 (FIG. 3), and filter 440 depicts an illustrative example of diagonal filter 340 (FIG. 3).

As shown in FIG. 4, each of filters 425, 430, and 440 is represented by a 2×2 matrix. In an arrangement each of the filters depicted in FIG. 4 is applied to frame data 320 (FIG. 3). For example, in an arrangement, filter 425 is applied to frame data 320 (FIG. 3) by setting a filtered output value (corresponding to a given element of frame data 320 (FIG. 3)) to a sum two elements in a first row of frame data 320 (FIG. 3) subtracted from the sum of two elements in a second, adjacent, row of frame data 320 (FIG. 3). In this arrangement, the filtering process is repeated for each element of frame data 320 (FIG. 3) to produce the filtered output of P×Q elements.

The design of filters 425, 430, and 440 depicted in FIG. 4 is merely illustrative, and many other designs would also be suitable for implementation. For example, any or all of filters 425, 430, and 440 may be of a size other than 2×2 pixels, and may exhibit an irregular (e.g., non-square) configuration. Further, in an implementation, the design of one or more of the filters depicted in FIG. 4 may be varied based on the corresponding element of frame data 320 (FIG. 3) that is being filtered. For example, the filters depicted in FIG. 4 may be truncated or otherwise reduced in size when filtering an element of frame data 320 (FIG. 3) that is on or near an edge of a video frame.

Figure 5:
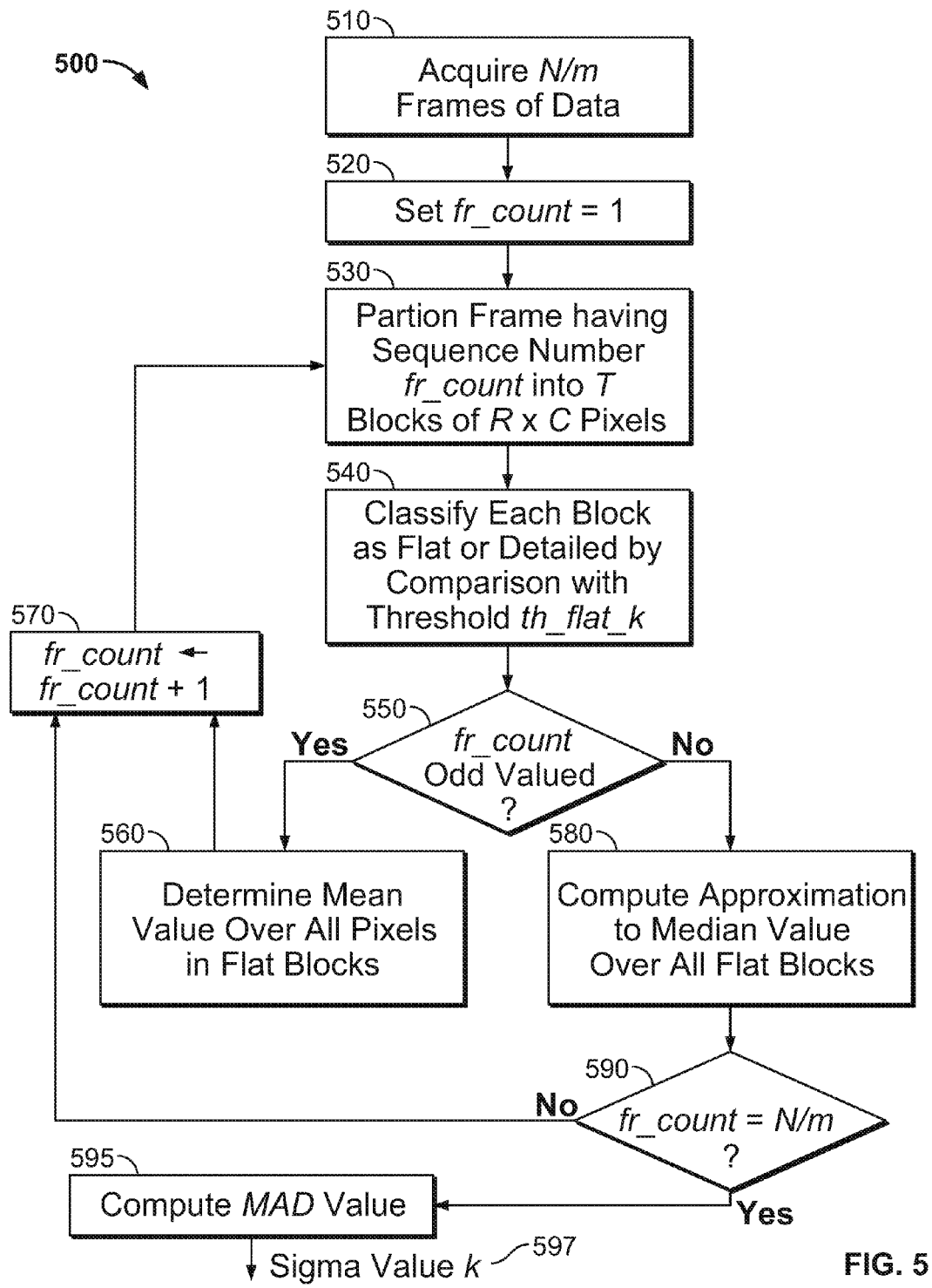
FIG. 5 shows illustrative example of an estimation process that is used to determine a noise characteristic of video data in accordance with an arrangement.

FIG. 5 shows illustrative example of an estimation process that is used to determine a noise characteristic of video data in accordance with an arrangement. Process 500 may be implemented by process 100, to extract a noise characteristic at 125, and/or by video processing system 200, in one or more of stages 240-1 through 240-m (all of FIG. 2). For clarity of presentation, the subsequent disclosure will assume that process 500 is implemented as stage 240-k (FIG. 2), where k is an integer value between the values of 1 and m, inclusive. However, it should be understood based on the disclosure and teachings provided herein that process 500 may be implemented in any of the other stages depicted in FIG. 2, and that process 500 may be implemented in video processing systems other than video processing system 200 (FIG. 2).

At 510, process 500 acquires N/m frames of video data, where each frame is assigned a sequence number from 1 through N/m. For example, in an arrangement, process 500 is implemented in one or more of stages 240-1 through 240-m (all of FIG. 2), and, in this case, the N/m frames of video data may be acquired from selector 230 (FIG. 2). Each pixel of each frame data obtained at 510 value has been assigned either the value '0' (if the pixel corresponds to a flat or homogenous portion of a video frame) or the value '1' (if the pixel corresponds to a detailed portion of a video frame). At 520, process 500 sets a counter, fr_count, to the value 1. At 530, process 500 partitions the frame acquired at 510 having a sequence number equal to the value of fr_count into a total of T blocks of R×C pixels each. In an arrangement, each frame acquired at 510 is of P×Q pixels, and the ratios P/R and Q/C are positive integers. For example, in a typical high definition application, P=1024 pixels, Q=768 pixels, and in this case, a suitable choice of R and C would be R=C=4. As described above, the total number of blocks created through the partitioning at 530 is referred to as T.

At 540, each of the T blocks created at 530 is classified as a flat block or a detailed block. In particular, the number of flat pixels (i.e., those having the value '0') in a block is determined, and the number is compared to the threshold th_flat_k. Blocks with a large number of flat pixels (i.e., with a number of flat pixels that exceeds threshold th_flat_k) are characterized as flat (or homogenous) blocks, while blocks with a number of flat pixels less than or equal to threshold th_flat_k are characterized as detailed blocks. This process is repeated for each of the T blocks created at 530. Thus, at 540, each of the T blocks created at 530 is classified as a flat block or a detailed block.

At 550, it is determined whether the current value of counter fr_count is odd valued. If fr_count is odd valued, process 500 proceeds to 560. At 560, the mean value of the diagonal filter outputs of all the pixels belonging to the flat blocks of a video frame corresponding to the frame having sequence number fr_count is determined. Process 500 determines the regions of a video frame that are flat at 540, but uses filter output data to compute the mean value at 560. In an arrangement, the filtered output value of diagonal filter 340 (FIG. 3) is used to compute the mean value at 560, where the mean is computed only over those pixels that correspond to flat blocks. Alternatively, the output of horizontal filter 325 (FIG. 3), vertical filter 330 (FIG. 3), or any other suitable filter may be used at 560 to determine the mean value. At 570, the value of the counter fr_count is incremented by 1 and then process 500 returns to 530 to partition a next frame (i.e., the frame acquired at 510 having a sequence number equal to the current value of fr_count) into T blocks.

If it is determined that fr_count is even valued at 550, then process 500 proceeds to 580. At 580, process 500 computes an approximation of a median value of the diagonal filter outputs over all pixels belonging to the flat blocks of a video frame corresponding to the frame having sequence number fr_count. In particular, process 500 computes an approximation to the median by calculating the mean of filter output values that correspond to flat blocks (as determined at 540) and that also satisfy the condition $$X_i < g\, u_i, \quad (1)$$

where $X_i$ is a filtered output pixel value, $u_i$ is the mean determined at 560 for the last odd value of fr_count, and where g is a programmable gain factor. The expression for the approximation to the median calculated at 580 is given by $$\text{Mean}(X_i | X_i < g\, u_i). \quad (2)$$

Typically, the value of the gain g is in the range 1 to 1.5, however any suitable value of g can be used. In an arrangement, the output value of diagonal filter 340 (FIG. 3) is used in the determination of equation (2) (i.e., as the values $X_i$). However, alternatively, the output of horizontal filter 325 (FIG. 3), vertical filter 330 (FIG. 3), or any other suitable filter may be used in the determination of equation (2).

At 590, process 500 determines whether the value of counter fr_count is equal to N/m. If the value of counter fr_count is not equal to N/m, then there are remaining frames to be processed from among the N/m frames acquired at 510. In this case, process 500 proceeds to 570, where the value of the counter fr_count is incremented by 1. Process 500 then returns to 530 to partition a next frame (i.e., the frame acquired at 510 having a sequence number equal to the current value of fr_count) into T blocks.

On the other, if the value of counter fr_count is equal to the value N/m at 590, then process 500 proceeds to 595. At 595, a Median Absolute Deviation (MAD) value corresponding to noise present in the set of N/m frames of data acquired at 510 is determined. In particular, the MAD value is determined by weighing each of the N/(2m) approximate median values determined during iterations of 580 according to the following relation $$\text{MAD} = (m_1 p_1 + \ldots + m_{N/(2m)} p_{N/(2m)}) / (p_1 + \ldots + p_{N/(2m)}), \quad (3)$$

where $m_v$ is the absolute value of the $v^{th}$ approximate median value determined at 580, and where $p_v$ is the number of pixels used in the calculation of $v^{th}$ approximate median value. Process 500 then normalizes the MAD value at 595 to produce sigma value k 597 according to the following relation $$\text{Sigma Value } k = \text{MAD}/0.6745. \quad (4)$$

In an arrangement, process 500 is implemented in one or more of stages 240-1 through 240-m (all of FIG. 2), and, in this case, sigma value k 250-k may represent any of sigma value 1 250-1 through sigma value m 250-m (all of FIG. 2).

FIG. 6 shows an illustrative example of an estimation process that is used to select a noise characteristic from a set of candidate noise characteristics in accordance with an arrangement. For example, process 600 may be used by video processing system 200 (FIG. 2), and, in particular sigma determination module 260 (FIG. 2), to select one of sigma value 1 250-1 through sigma value m 250-m (all of FIG. 2) as representative of a standard deviation of noise present in N frames of video data 119 (FIGS. 1 and 2). In an arrangement, estimated sigma 130 (FIGS. 1, 2, and 6) is determined by comparing the number of flat blocks used in the computation of each of sigma value 1 250-1 through sigma value m 250-m (all of FIG. 2).

Estimated sigma 130 (FIGS. 1, 2, and 6) is assigned to the value of sigma value k 250-k (FIG. 2), where k is an integer value between 1 and m, only if each of following criteria is met. First, the number of flat blocks used to calculate sigma value k 250-k must be adequate for estimation of a noise characteristic. That is, letting $\text{blocks}_k$ denote the number of flat blocks determined at stage k 240-k (FIG. 2), the condition $$\text{blocks}_k > \tau_k \quad (5)$$

must be satisfied, where $\tau_k$ is a suitable positive threshold.

Second, the number of flat blocks for the stage having the next highest number (i.e., the stage with the next highest valued set of thresholds), if such a stage exists, must be larger than the flat block count of the present stage, but not by too large a value. This condition is expressed $$\text{blocks}_k \tau_{k+1,L} < \text{blocks}_{k+1} < \text{blocks}_k \tau_{k+1,H}, \quad (6)$$

where $\tau_{k+1,L}$ and $\tau_{k+1,H}$ are each positive thresholds, and where $\tau_{k+1,L} < \tau_{k+1,H}$. On the other hand, if k corresponds to the stage having the highest number, e.g., if k=m, in video processing system 200 of FIG. 2, then the condition of equation (6) is not applied.

An evaluation of the above-described conditions are illustrated by process 600 for the exemplary case that m=4, which is explained as follows. At 605, process 600 starts. At 610, the two relevant conditions are evaluated. In particular, it is determined if $$\text{blocks}_1 > \tau_1, \text{ and} \quad (7)$$

$$\text{blocks}_1 \tau_{2,L} < \text{blocks}_2 < \text{blocks}_1 \tau_{2,H}. \quad (8)$$

If equations (7) and (8) are satisfied, process 600 proceeds to 615, where estimated sigma 130 (FIGS. 1, 2, and 6) is set equal to sigma value 1 250-1 (FIG. 2). On the other hand, if one or both of these conditions is not satisfied, then process 600 proceeds to evaluate the stage 2 240-2 (FIG. 2) at 620. In particular, it is determined if $$blocks_2 > \tau_2, \text{ and} \quad (9)$$

$$blocks_2 \tau_{3,L} < blocks_3 < blocks_2 \tau_{3,H}. \quad (10)$$

If equations (9) and (10) are satisfied, process 600 proceeds to 625, where estimated sigma 130 (FIGS. 1, 2, and 6) is set equal to sigma value 2 250-2 (FIG. 2). On the other hand, if one or both of these conditions is not satisfied, then process 600 proceeds to evaluate stage 3 240-3 (FIG. 2) at 630.

At 630, the two relevant conditions are evaluated. In particular, it is determined if $$blocks_3 > \tau_3, \text{ and} \quad (11)$$

$$blocks_3 \tau_{4,L} < blocks_4 < blocks_3 \tau_{4,H}. \quad (12)$$

If equations (11) and (12) are satisfied, process 600 proceeds to 635, where estimated sigma 130 (FIGS. 1, 2, and 6) is set equal to sigma value 3 250-3 (FIG. 2). On the other hand, if one or both of these conditions is not satisfied, then process 600 proceeds to evaluate stage 4 240-4 (FIG. 2) at 640.

At 640, only a single condition is evaluated since k=4 represents the final stage in video processing system 200 (FIG. 2). In particular, it is determined if $$blocks_4 > \tau_4. \quad (13)$$

If equation (13) is satisfied, process 600 proceeds to 645, where estimated sigma 130 (FIGS. 1, 2, and 6) is set equal to sigma value 4 250-4 (FIG. 2). On the other hand, if equation (13) is not satisfied, then process 600 indicates that is undesirable to compute a estimated sigma value based on the present frame set. In particular, process 600 proceeds to 650, where estimated sigma 130 (FIGS. 1, 2, and 6) is set equal to a NULL value (i.e., the NULL value indicates that an estimated value of the noise characteristic sigma is not computed).

The foregoing describes, inter alia, methods and apparatus for estimating noise characteristics in digital video data. The disclosed techniques may be implemented independently from any information from a decoder. The disclosed techniques may be implemented using a reduced hardware set, and in some arrangements, do not require any frame storage. Noise characteristics derived using the techniques described herein may be used as parameters in noise removal packages and/or in other post-processing techniques for noisy content.

The above described arrangements and embodiments are presented for the purposes of illustration and not of limitation. For example, the described technique of FIG. 1 may be performed over any number of video frames, and the described technique may be performed with or without video frame storage. Further, one or more parts of techniques described above may be performed in a different order (or concurrently) and still achieve desirable results. In addition, the techniques of the disclosure may be implemented in hardware, such as on an application specific integrated circuit (ASIC) or on a field-programmable gate array (FPGA). The techniques of the disclosure may also be implemented in software.

What is claimed is:

1. A method of determining a characteristic of video data, the method comprising:
   obtaining a set of N frames of the video data;
   filtering the set of N frames using at least one filter to produce a set of N×T blocks of filtered video data, wherein T is a partition size associated with the at least one filter;
   classifying each block in the set of N×T blocks as either a flat type block or a detailed type block;
   associating with a frame in the set of N frames, a subset of blocks in the classified set of N×T blocks, wherein the subset of blocks are flat type blocks; and
   determining the characteristic of video data based, at least in part, on the subset of blocks associated with the frame;
   obtaining a next set of N frames of the video data; and
   applying a noise reduction technique to the next set of N frames based on the characteristic of the video data.

2. The method of claim 1, wherein the determining comprises:
   determining m estimates of the characteristic of video data based on pixel values of blocks in the set of N×T blocks that have been classified as the flat type; and
   selecting one of the m estimates as the characteristic of video data based, at least in part, on pixel values of the subset of blocks in the set of N×T blocks.

3. The method of claim 1, wherein the subset of blocks comprises the set of N×T blocks.

4. The method of claim 1, wherein the at least one filter comprises a diagonally oriented high-pass filter.

5. The method of claim 2, wherein determining the m estimates of the characteristic of video data comprises:
   partitioning the set of N frames of video data into m sets of N/m frames each; and
   applying a different estimator to each of the m sets of N/m frames to produce a corresponding estimate of the characteristic of video data.

6. The method of claim 1, wherein the characteristic of video data is a standard deviation value associated with noise present in the set of N frames.

7. The method of claim 1, wherein the characteristic of video data is a median absolute deviation value associated with noise present in the set of N frames.

8. The method of claim 1, further comprising:
   inputting a set of T blocks of filtered video data to a maximum module to produce a first output, and
   inputting the set of T blocks of filtered video data to a minimum module to produce a second output; and
   determining at least one variance measure of a video frame in the set of N frames based on the first output and second output.

9. The method of claim 1, further comprising:
   inputting a set of T blocks of filtered video data to a maximum module to produce a first output, and
   inputting the set of T blocks of filtered video data to a minimum module to produce a second output; and
   determining at least one activity value associated with a video frame in the set of N frames based on the first output and second output.

10. A video processing system for determining a characteristic of video data, the video processing system comprising:
    acquisition circuitry configured to:
    obtain a set of N frames of the video data; and
    obtain a next set of N frames of the video data;
    filtering circuitry configured to apply at least one filter to the set of N frames to produce a set of N×T blocks of filtered video data, wherein T is a partition size associated with the at least one filter;
    estimation circuitry configured to:
    classify each block in the set of N×T blocks as either a flat type block or a detailed type block;
    associate with a frame in the set of N frames, a subset of blocks in the classified set of N×T blocks, wherein the subset of blocks are flat type blocks; and determine the characteristic of video data based, at least in part, on the subset of blocks associated with the frame; and noise reduction circuitry configured to apply a noise reduction technique to the next set of N frames based on the characteristic of the video data.

11. The system of claim 10, wherein the estimation circuitry is further configured to determine the characteristic of video data by:

determining m estimates of the characteristic of video data based on pixel values of blocks in the set of N×T blocks that have been classified as the flat type; and selecting one of the m estimates as the characteristic of video data based, at least in part, on pixel values of the subset of blocks in the set of N×T blocks.

12. The system of claim 11, wherein determining the m estimates of the characteristic of video data comprises:

partitioning the set of N frames of video data into m sets of N/m frames each; and applying a different estimator to each of the m sets of N/m frames to produce a corresponding estimate of the characteristic of video data.

13. The system of claim 10, wherein the subset of blocks comprises the set of N×T blocks.

14. The system of claim 10, wherein the at least one filter comprises a diagonally oriented high-pass filter.

15. The system of claim 10, wherein the characteristic of video data is a standard deviation value associated with noise present in the set of N frames.

16. The system of claim 10, wherein the characteristic of video data is a median absolute deviation value associated with noise present in the set of N frames.

17. The system of claim 10, wherein the estimation circuitry is further configured to:

input a set of T blocks of filtered video data to a maximum module to produce a first output, and input the set of T blocks of filtered video data to a minimum module to produce a second output; and determine at least one variance measure of a video frame in the set of N frames based on the first output and second output.

18. The system of claim 10, wherein the estimation circuitry is further configured to:

input a set of T blocks of filtered video data to a maximum module to produce a first output, and input the set of T blocks of filtered video data to a minimum module to produce a second output; and determine at least one activity value associated with a video frame in the set of N frames based on the first output and second output.

* * * * *